United States Patent [19]
Numbers

[11] 3,909,107
[45] Sept. 30, 1975

[54] HOOD FOR THE LENS OF OPTICAL INSTRUMENTS WITH PIVOTALLY MOUNTED LENS COVER

[76] Inventor: Jody L. Numbers, 2202 S. Priest, Suite 102, Tempe, Ariz. 85282

[22] Filed: Mar. 25, 1974

[21] Appl. No.: 454,559

[52] U.S. Cl. .................. 350/58; 350/65; 354/287
[51] Int. Cl.² ................. G02B 23/16; G03B 11/04
[58] Field of Search ..................... 350/57–60, 350/65; 33/244; 354/287, 202

[56] References Cited
UNITED STATES PATENTS

| | | | |
|---|---|---|---|
| 849,409 | 4/1907 | Martin | 350/57 |
| 1,775,180 | 9/1930 | Worsching | 350/58 |
| 2,849,795 | 9/1958 | Vissing | 350/65 X |
| 2,889,629 | 6/1959 | Darkenwald | 350/65 X |
| 3,399,011 | 8/1968 | Heiniger | 350/60 |
| 3,594,062 | 7/1971 | Disley | 350/57 X |
| 3,715,149 | 2/1973 | Freeland | 350/65 X |
| 3,836,985 | 9/1974 | Lange | 350/60 X |
| 3,840,883 | 10/1974 | Choate | 350/58 X |

*Primary Examiner*—David H. Rubin
*Attorney, Agent, or Firm*—Warren F. B. Lindsley

[57] ABSTRACT

A hood for the lens of optical instruments such as cameras with a pivotally mounted spring biased lens cap mounted therein and operable from outside of the hood.

10 Claims, 6 Drawing Figures

U.S. Patent  Sept. 30,1975  3,909,107

HOOD FOR THE LENS OF OPTICAL INSTRUMENTS WITH PIVOTALLY MOUNTED LENS COVER

BACKGROUND OF THE INVENTION

This invention relates to a dual purpose hood and lens cap for protecting the lens of a camera from glare while pictures are being taken and covering and protecting the lens when the camera is not in use. The claimed structure is secured to the lens mounting of the camera and has a spring biased lens cap mounted within the hood which is pivotally mounted for movement between lens covering and lens exposing positions by a lever extending outside of the outer periphery of the hood.

DESCRIPTION OF THE PRIOR ART

Sunshades and lens caps have been used for years for protecting the lens of a camera from glare while pictures are taken and from dust while the camera is not in use. Some structures have been provided which combined the sunshade and lens cap features, such as that shown in U.S. Pat. Nos. 1,775,180 and 3,715,149. Although these prior art structures eliminated time spent in removing the lens cap from the lens and reduced glare, none of them have achieved their functions with a simple integrated structure formed of a few parts which may be inexpensively manufactured, easily assembled and quickly utilized. An inexpensive product is disclosed herein for use by the public rather than only by the professional who could afford the prior art hardware offering some of these features.

SUMMARY OF THE INVENTION

In accordance with the invention claimed, a combination sunshade or hood and lens cap arrangement is provided which is made from a few easily assembly parts that are quickly assembled into an integrated structure which is threadedly mounted on the lens mount of a camera. The hood may be generally a frustum of a right circular cone tapering outwardly from its attachment to the lens mount with a spring biased lens cap pivotally mounted within a distortion of the frustum's configuration at a point adjacent the lens. The lens cap pivotally moves from a lens protective position to a lens exposing position adjacent the inside periphery of the hood by a hand actuated lever mounted to extend outside of the periphery of the hood.

It is, therefore, one object of this invention to provide a new and improved sunshade or hood and lens cap configuration for optical instruments.

Another object of this invention is to provide a hood for mounting on a lens mount of a camera having a pivotally mounted lens cap attached thereto for movement from lens covering to lens exposure within the confines of the hood.

A further object of this invention is to provide a hood for attachment to a lens mount having a snap action pivotally mounted spring biased lens cap mounted therein.

A still further object of this invention is to provide an improved inexpensive hood and lens cap configuration for cameras which is easy to fabricate, assemble and mount on or remove from a camera.

Further objects and advantages of the invention will become apparent as the following description proceeds and the features of novelty which characterize this invention will be pointed out with particularity in the claims annexed to and forming a part of this specification.

DESCRIPTION OF THE PREFERRED EMBODIDMENT

Figure 1:
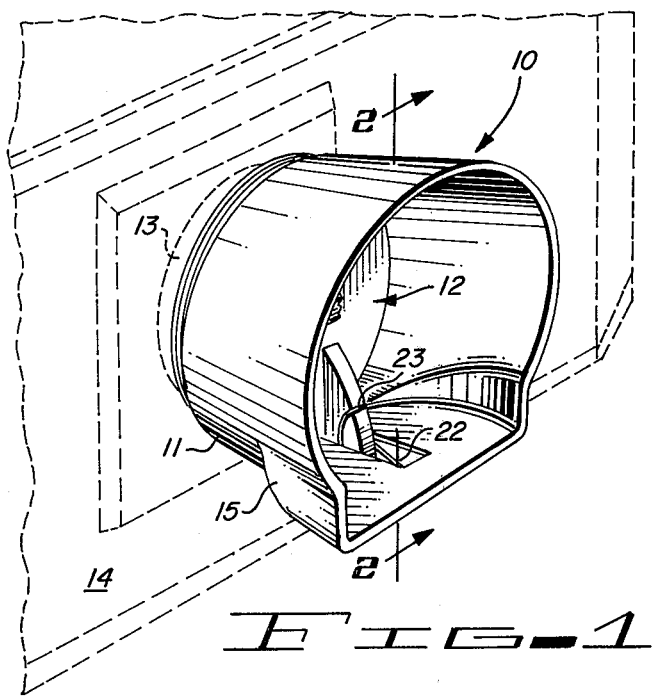
FIG. 1 is a perspective view of a combination hood and lens cap device applied to the lens mount of a camera with the components of the lens cap in closed position.

Referring more particularly to the drawing by characters of reference, FIG. 1–4 disclose an optical device 10 comprising a sunshade or hood 11 employing a pivotally mounted spring biased lens cap 12 therein which is theadedly mounted to the lens mount 13 of a camera 14. The hood is generally of a hollow frusto-conical shape having a distortion 15 formed along its periphery for receiving the lens cap when it is pivotally moved to its lens open position.

Figure 2:
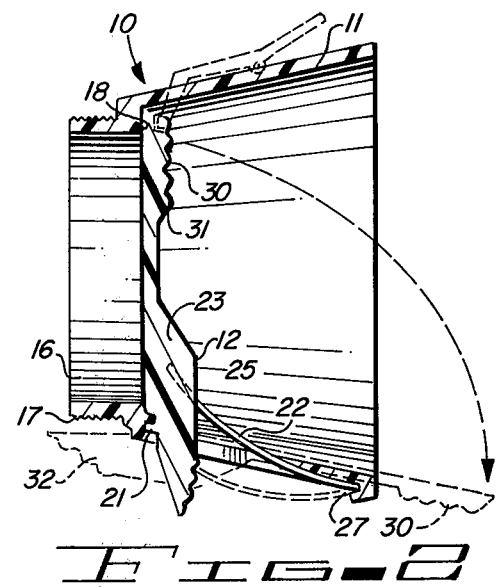
FIG. 2 is a cross-sectional view of FIG. 1 taken along the line 2—2.

As shown in FIGS. 1 and 2, the tubular configuration of the hood merges at its smallest end into a cylindrical portion 16 the outer surface of which is provided with threads 17 for interengaging the threads of the lens mount of camera 14. The inside surface of hood 11 is provided with a circular flange or shoulder 18 which extends from the inside periphery of the tapered walls of the hood to the inside periphery of the cylindrical portion 16 to provide a seat for lens cap 12.

Lens cap 12 comprises a disc 19 shaped to cover the opening in cylindrical portion 16 and to seat against the flat surface of shoulder 18 as shown in FIG. 2.

Figure 3:
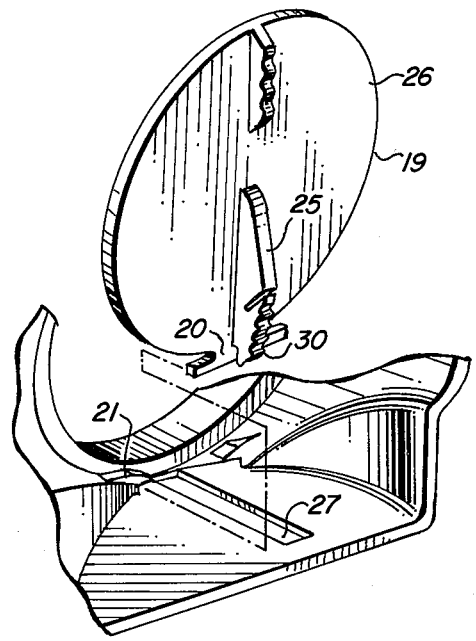
FIG. 3 is a partial exploded view of the hood and lens cap showing details of the pivotal connection of the lens cap to the hood.
Figure 4:
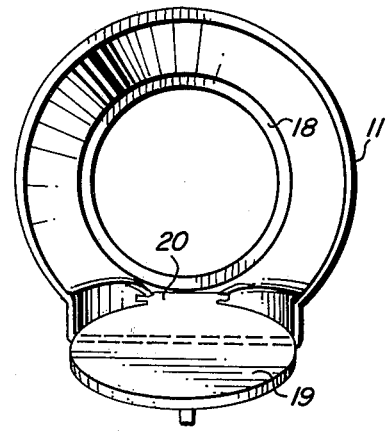
FIG. 4 is a front elevational view of the device shown in FIG. 1 with the lens cap in closed position.

As shown in FIG. 3, disc 19 is provided with a T-shaped protrusion 20 extending from its periphery which serves as the pivotally mounting means of the lens cap with the hood. The cross arm of the T-shaped protrusion is arranged to fit within a groove 21 in shoulder 18 of the hood and is maintained in groove 21 by a suitable spring 22.

Spring 22, as shown in FIGS. 2 and 3, may be a hairpin shaped configuration having its mid-section 23 fitted into a groove 24 in a lever arm 25 mounted on the outside surface 26 of disc 19. The ends of spring 22 are fittedly biased into suitable opening in the periphery of a slot 27 formed in the distortion 15 of the hood and arranged to extend longitudinally of the hood.

As noted from FIG. 2 of the drawing, spring 22 may be an over center spring arranged to bias the lens cap in either open or closed directions. In FIG. 2, for purpose of illustration only, spring 22 is shown biasing the lens cap to its open position. A release latch 28 is shown pivotally mounted on the outside periphery of hood 11 to hold lens cap 12 in its closed position and by clock-wise rotation of this latch, as shown, the lens cap will be released and the cap will move under the bias of spring 22 to its open position shown in dash lines juxtapositioned to the inside surface of member 11 in indentation 15. The cap may then be pushed back to its lens closed position (shown in full lines) by finger pressure applied to the knurled surface 30 of a lever arm 31 mounted on disk 19 at the diagonally opposite side to that of lever arm 25 and the rotation of this arm in a counter clockwise direction as indicated in FIG. 2.

It should be recognized that spring 22 may be arranged to bias when in an over center position lens cap 12 to its closed position shown in full in FIG. 2 and in that instance the knurled surface 32 and particularly that end of lever arm 25 will be rotated counterclockwise to close the lens cap.

Figure 5:
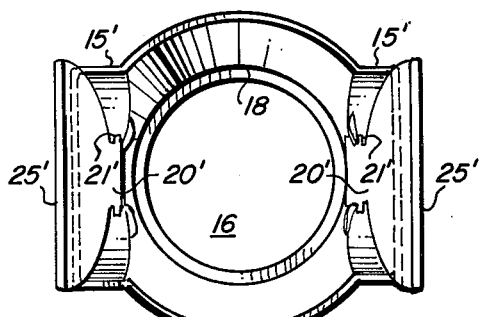
FIG. 5 is a front elevational view of a modification of the device shown in FIG. 1.
Figure 6:
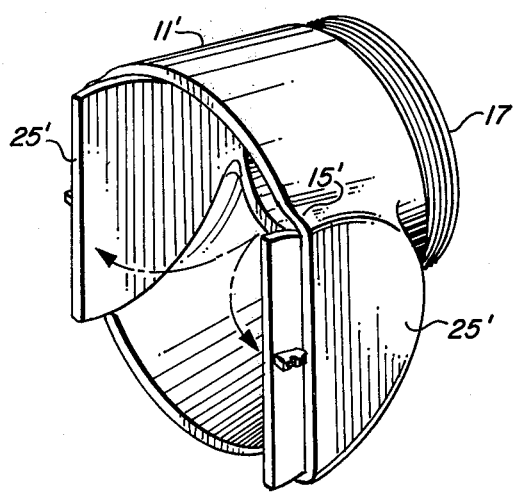
FIG. 6 is a perspective view of the device shown in FIG. 5 with the lens cap sections in open position.

FIGS. 5 and 6 disclose a modification of the structure shown in FIGS. 1 – 4 wherein hood 11 shown in FIGS. 1 – 4 is modified in hood 11 to provide a pair of like distortion 15' on opposite sides of the tubular configuration of hood 11' for receiving therein two identical half 25' of the lens cap. Each half is provided with T-shaped protrusions 20' which are pivotally mounted in grooves 21' in the manner disclosed in FIGS. 1 – 4. Each half of the lens cap may be biased to open or closed positions as disclosed for the structure shown in FIGS. 1 – 4. All other parts similar to the structure shown in FIGS. 1 – 4 are given similar reference characters.

As noted from the drawing and the description above, a quick acting lens cap is pivotally mounted in a tubular hood threadly attached to the lens mount of an optical instrument such as a camera. This device may be formed of plastic parts economically manufactured and assembled to provide a positive acting locked open or closed lens cap mounted in a suitable hood or sunshade.

Although but a few embodiments of the present invention have been illustrated and described, it will be apparent to those skilled in the art that various changes and modifications may be made therein without departing from the spirit of the invention or from the scope of the appended claims.

What is claimed is:

1. A combination hood and lens cap for mounting on the lens mount of a camera comprising:
    a tubular tapered member merging into a cylindrical portion for attaching on the front end of the lens mount of the camera,
    said member defining a ledge extending around its inside periphery at a point adjacent the merging of the tapered member into said cylindrical portion for defining a lens cap seating surface,
    a lens cap pivotally mounted within said member and comprising a substantially flat disc like surface for covering in one position the camera lens, the periphery of said flat disc engaging said seating surface in lens cap closed position,
    said disc having a protrusion extending from its peripheral edge for interfitting with a receiving member on the inside of said member to provide the pivotal mounting of said lens cap, and
    spring means extending between said lens cap and said member for biasing said disc like surface to one of its lens open and lens closed positions,
    said member being distorted along its length to provide an indentation for receiving in juxtapositioned relationship said lens cap when pivoted to its lens open position, whereby said lens cap is moved out of the light path of the lens.

2. The combination hood and lens cap set forth in claim 1 wherein:
    said protrusion comprises a T-shaped configuration the leg of which is attached to the periphery of said disc and the cross arm of which is pivotally mounted in said receiving member.

3. The combination hood and lens cap set forth in claim 2 wherein:
    said receiving member is mounted adjacent said seating surface of said ledge.

4. The combination hood and lens cap set forth in claim 1 wherein:
    said cylindrical portion of said member is threaded for engaging mating threads on the lens mount.

5. The combination hood and lens cap set forth in claim 1 wherein:
    said spring means comprises an over center member for biasing said disc like surface into engagement with said seating surface when in a lens closed position.

6. The combination hood and lens cap set forth in claim 5 wherein:
    said spring means comprises a hair pin shaped spring having its leg ends attached to the inside periphery of said member and its mid section connected to said disc.

7. The combination hood and lens cap set forth in claim 1 wherein:
    said member is slotted longitudinally of its length, and
    said lens cap is provided with a lever arm extending through said slot,
    whereby said lens cap may be pivotally moved by the user applying finger pressure on said lever arm against the biasing action of said spring to pivotally move said lens cap.

8. The combination hood and lens cap set forth in claim 7 wherein:
    said spring means is positioned to bias said lens cap to its lens uncovered position when said spring means is in an over center position, and
    latch means mounted on the outside of said member and extending through a second slot in said member for engaging and holding said lens cap closed against the bias of said spring means and when rotated to a given position releasing said lens cap to cause it to rotate under the bias of said spring means to its lens uncovered position.

9. The combination hood and lens cap set forth in claim 6 wherein:
    said disc is provided with a slot for receiving and pivotally mounting the mid section of said hair pin shaped pin.

10. The combination hood and lens cap set forth in claim 1 wherein:
    said lens cap comprises substantially semi-circular disc like surfaces,
    each disc like surface being provided with a protrusion extending from a portion of its arcuate peripheral configuration for interfitting with a different receiving member on the inside of said member for providing pivotal mounting for each disc like surface of said lens cap,
    said member being distorted along its length to provide two indentations one for receiving each of said semi-circular disc like surfaces of said lens cap.

* * * * *